United States Patent [19]
Wheatley et al.

[11] Patent Number: 5,212,730
[45] Date of Patent: May 18, 1993

[54] VOICE RECOGNITION OF PROPER NAMES USING TEXT-DERIVED RECOGNITION MODELS

[75] Inventors: Barbara J. Wheatley; Joseph W. Picone, both of Plano, Tex.

[73] Assignee: Texas Instruments Incorporated, Dallas, Tex.

[21] Appl. No.: 724,299

[22] Filed: Jul. 1, 1991

[51] Int. Cl.$^5$ .......................... G10L 5/06; G10L 5/00; G10L 5/02
[52] U.S. Cl. ...................................... 381/43; 381/52; 381/41
[58] Field of Search ................................ 381/41–43, 381/52

[56] References Cited

U.S. PATENT DOCUMENTS

| | | | |
|---|---|---|---|
| 4,624,010 | 11/1986 | Takebayashi | 381/43 |
| 4,716,593 | 12/1987 | Hirai et al. | 381/43 |
| 4,833,713 | 5/1989 | Muroi et al. | 381/41 |
| 4,975,959 | 12/1990 | Benbassat | 381/43 |
| 5,040,218 | 8/1991 | Vitale et al. | 381/52 |

OTHER PUBLICATIONS

IEEE Trans. on Acoustics, Speech and Signal Processing, vol. 37, No. 3, Mar. 1989, "Phoneme Recognition Using Time-Delay Neural Networks" by Waibel et al., pp. 328–339.

*Primary Examiner*—Dale M. Shaw
*Assistant Examiner*—Kee M. Tung
*Attorney, Agent, or Firm*—Pehr B. Jansson; Richard L. Donaldson; William E. Hiller

[57] ABSTRACT

A name recognition system (FIG. 1) used to provide access to a database based on the voice recognition of a proper name spoken by a person who may not know the correct pronunciation of the name. During an enrollment phase (10), for each name-text entered (11) into a text database (12), text-derived recognition models (22) are created for each of a selected number of pronunciations of a name-text, with each recognition model being constructed from a respective sequence of phonetic features (15) generated by a Boltzmann machine (13). During a name recognition phase (20), the spoken input (24,25) of a name (by a person who may not know the correct pronunciation) is compared (26) with the recognition models (22) looking for a pattern match—selection of a corresponding name-text is made based on a decision rule (28).

16 Claims, 3 Drawing Sheets

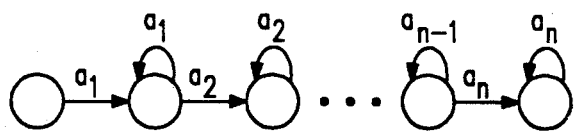
FIG. 3a
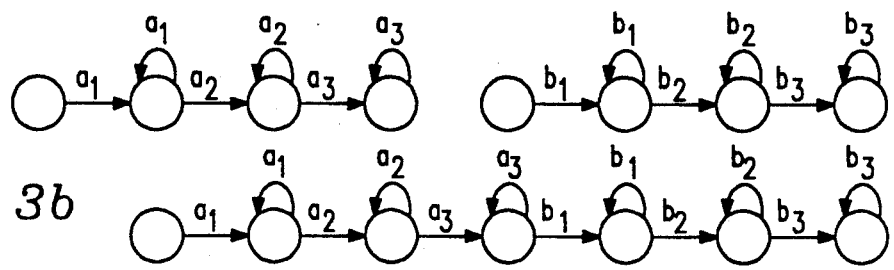
FIG. 3b
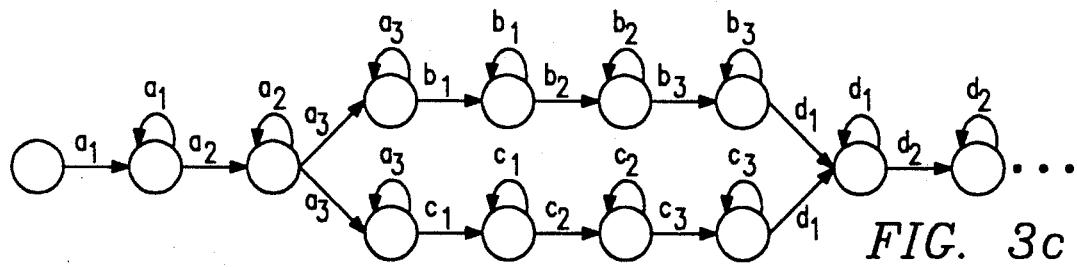
FIG. 3c
FIG. 3d
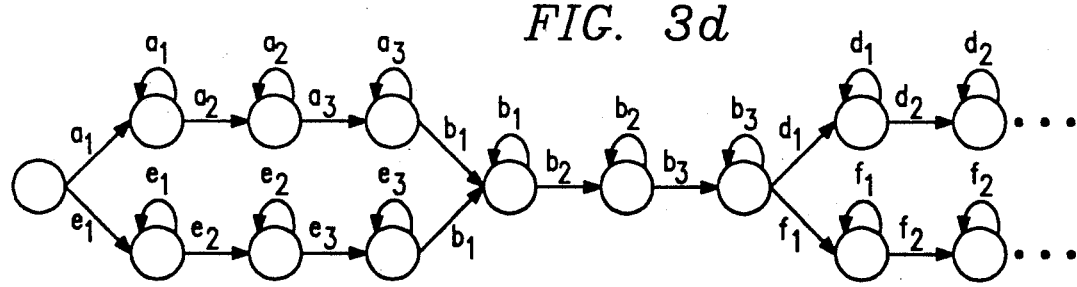
FIG. 4
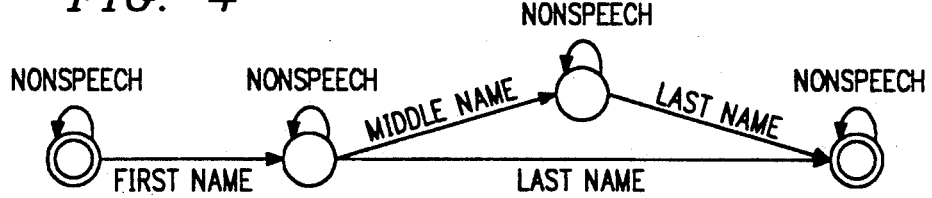

VOICE RECOGNITION OF PROPER NAMES USING TEXT-DERIVED RECOGNITION MODELS

TECHNICAL FIELD OF THE INVENTION

The invention relates generally to voice recognition, and more particularly relates to a method and system for computerized voice recognition of a proper name using text-derived recognition models. In even greater particularity, for each name in a database, a separate recognition model is created for each of a selected number of pronunciations, with each recognition model being constructed from a respective sequence of phonetic features generated by a Boltzmann machine.

BACKGROUND OF THE INVENTION

Computerized voice recognition systems designed to recognize designated speech sequences (words and/or numbers) generally include two aspects: modeling and recognition. Modeling involves creating a recognition model for a designated speech sequence, generally using an enrollment procedure in which a speaker enrolls a given speech sequence to create an acoustic reference. Recognition involves comparing an input speech signal with stored recognition models looking for a pattern match.

Without limiting the scope of the invention, this background information is provided in the context of a specific problem to which the invention has applicability: a voice recognition system capable of accessing database records using the voice input of associated proper names. Such a system should accommodate a reasonable number of alternative pronunciations of each name.

A voice recognition system capable of recognizing names would be useful in many data entry applications. One such application is in the medical field in which patient records are routinely organized and accessed by both name and patient number.

For health care providers, using patient numbers to access patient records is problematic due to the impracticality of remembering such numbers for any significant class of patients. Thus, name recognition is a vital step in transforming medical record access from keyboard input to voice input.

Permitting name-based access to patient records via computerized voice recognition involves a number of problems. For such a system to be practical, both recognition model creation and name recognition would have to be speaker-independent. That is, speaker-independent recognition would be required because the identity of the users would be unknown, while model generation would have to be speaker-independent because a user would not necessarily know how to pronounce a patient's name.

Current systems designed to generate name pronunciations from text are typically an adaptation of text-to-speech technology, using extensive rule sets to develop a single proper pronunciation for a name based on the text of the name. Current systems designed to perform name recognition typically require users to input the correct pronunciation of the name, for example, by pronouncing the name.

These systems are designed to produce a single correct pronunciation of the name. Name recognition then requires the user to input the name using the nominal pronunciation, i.e,. these name recognition systems are not designed to recognize alternative pronunciations of the same name, however reasonable such pronunciations may be.

Accordingly, a need exists for a computerized name recognition system for use in accessing name-associative records in a database, such as a medical records database. The system should be speaker-independent in that it would recognize names spoken by unknown users, where the user might not know the correct pronunciation of the name.

SUMMARY OF THE INVENTION

The invention is a name recognition technique using text-derived recognition models in recognizing the spoken rendition of name-texts (i.e., names in textual form) that are susceptible to multiple pronunciations, where the spoken name input (i.e., the spoken rendition of a name-text) is from a person who does not necessarily know the proper pronunciation of the name-text. Thus, the system generates alternative recognition models from the name-text corresponding to a reasonable number of pronunciations of the name.

In one aspect of the invention, the name recognition technique involves: (a) entering name-text into a text database which is accessed by designating name-text, (b) for each name-text in the text database, constructing a selected number of text-derived recognition models from the name-text, each text-derived recognition model representing at least one pronunciation of the name, (c) for each attempted access to the text database by a spoken name input, comparing the spoken name input with the stored text-derived recognition models. If such comparison yields a sufficiently close pattern match to one of the text-derived recognition models based on a decision rule, the name recognition system provides a name recognition response designating the name-text associated with such text-derived recognition model.

In an exemplary embodiment of the invention, the recognition models associated with alternative name pronunciations are generated automatically from the name-text using an appropriately trained Boltzmann machine. To obtain the alternative pronunciations, each name-text is input to the Boltzmann machine a selected number of times (such as ten), with the machine being placed in a random state prior to each input. For each input, the Boltzmann machine generates a sequence of phonetic features, each representing at least one pronunciation of the name-text (and each of which may be different).

When the input cycles for a name-text are complete, the phonetic-feature sequences that are different are used to construct a corresponding number of recognition models using conventional Hidden Markov Modeling (HMM) techniques—the recognition models are based on phonetic models derived from a comprehensive speech database providing good acoustic-phonetic coverage. The HMM recognition models are then stored for use during name recognition operations.

Name recognition is performed using conventional HMM recognition techniques. In particular, for each spoken name input, the HMM recognition procedure assigns scores to text-derived recognition models (representing the likelihood that the spoken name input is an instance of that recognition model), and evaluates name scores using a decision rule that selects either: (a) a single name, (b) a set of N rank-ordered names, or (c) no name (a rejection).

Prior to pronunciation generation operations, the Boltzmann machine is appropriately trained using a conventional training (or learning) algorithm and a training database. The recommended approach uses a training database containing around 10,000 names—performance improves as the training set size increases. No additional training is performed when using the Boltzmann machine to generate pronunciations for particular names or name sets.

The total number of names stored in the application database is a performance issue—for typical applications, the recommended approach is to limit the active database size to about 500 names.

The technical advantages of the invention include the following. The only input required by the name recognition system is text—it does not require speech input or other representation of correct pronunciation (such as phonetic transcription). The system generates alternative recognition models, corresponding to different pronunciations, thus allowing recognition of alternative reasonable pronunciations, not just the correct pronunciation.

BRIEF DESCRIPTION OF THE DRAWINGS

For a more complete understanding of the invention, and for further features and advantages, reference is now made to the following Detailed Description of an exemplary embodiment of the invention, taken in conjunction with the accompanying Drawings, in which:

FIGS. 3a-3d illustrate the HMM model construction operation; and

FIG. 4 illustrates the higher-level text-derived recognition model used in the name recognition process.

DETAILED DESCRIPTION OF THE INVENTION

The Detailed Description of an exemplary embodiment of the speaker-independent name recognition system is organized as follows:

1. Name Recognition Technique
2. Recognition Model Creation
    2.1. Phonetic Feature Sequence Generation
    2.2. HMM Model Construction
3. Name Recognition
    3.1. HMM Recognition
    3.2. Decision Rule
4. Conclusion The exemplary name recognition system is used to access the records of a name-associative database, such as a medical records database, in which each record has associated with it a proper name.

1. Name Recognition Technique

The basic name recognition technique involves creating acoustic recognition models from the text of previously entered names prior to any name recognition operations. The exemplary name recognition technique creates the recognition models using a Boltzmann machine to generate, from input name-text (i.e., the textual form of a name), phonetic feature sequences (or other pronunciation representations) that are used by a HMM (Hidden Markov Model) generator to construct HMM recognition models. For each name, alternative HMM recognition models are generated corresponding to alternative pronunciations.

Figure 1:
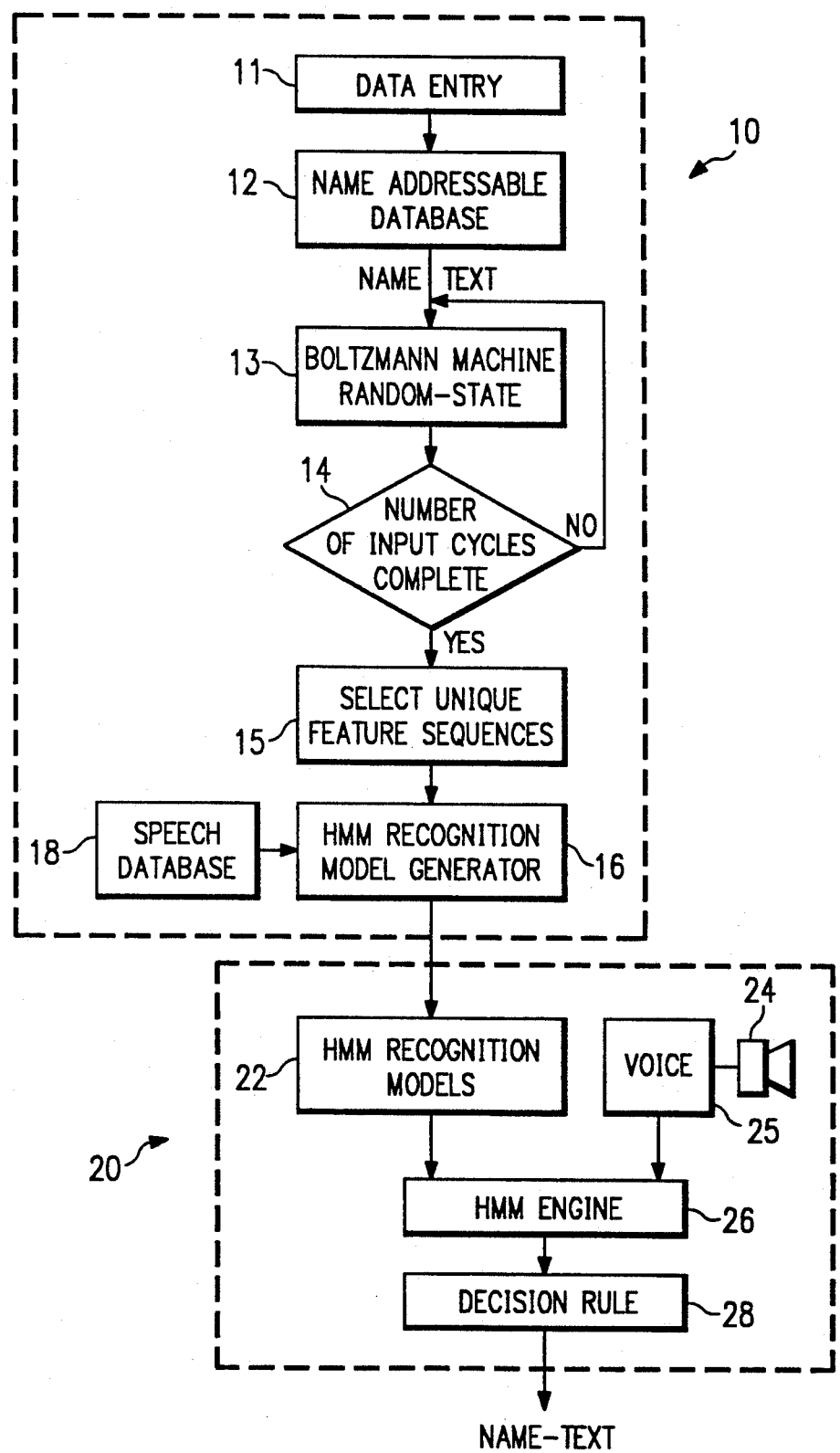
FIG. 1 illustrates the name recognition system, including enrollment and name recognition.

FIG. 1 illustrates the exemplary name recognition technique. The name recognition system is used to provide access to a name-addressable database, such as a medical records database. It includes an enrollment phase (10) and a name recognition phase (20).

During the enrollment phase (10), name-texts are entered (11) into the name-addressable text database (12), such as during patient record creation, using normal keyboard data entry. For the exemplary medical records application, names are assumed to be available on an institution-wide medical records database, although a scenario can be envisioned where common names would be added or deleted by pre-storing many of the most common names.

For each name entered into the name-addressable text database, the name-text is repetitively input (during a selected number of input cycles) to an appropriately configured Boltzmann machine (13), which is reset to a random state prior to each input. For each name-text input, the Boltzmann machine generates a phonetic feature sequence -- while a phonetic feature sequence output from the Boltzmann machine is preferred, other pronunciation representations could be used.

The Boltzmann machine (13) will generate different phonetic feature sequences from the same input name-text, corresponding to different pronunciations of the name. When a name-text has been cycled through the Boltzmann machine the selected number of times (14), the resulting phonetic feature sequences are compared, and the different sequences, representing different pronunciations, are selected (15)—not every phonetic feature sequence will be different, and indeed, it is possible that none will be different (i.e., only a single pronunciation is represented).

The number of different sequences generated from a given number of inputs of the same name-text will depend upon the name and the number of inputs. The recommended approach is to input each name ten times, which should insure that phonetic feature sequences will be generated for a high percentage of the reasonable pronunciations of any name.

The different phonetic feature sequences are input to a HMM recognition model generator (16). For each feature sequence, the HMM recognition model generator constructs a corresponding HMM recognition model using conventional HMM model generation techniques—the HMM recognition models are based on phonetic models derived from a speech database (18) providing good acoustic-phonetic coverage. The HMM recognition models are stored in an HMM recognition model database (22), to be used for name recognition operations.

Name recognition operations (20) are initiated by the spoken input (24) of a name, which is converted (25) into a corresponding speech signal.

The speech signal is input into an HMM recognition engine (26). Using conventional HMM recognition techniques, the HMM recognition engine accesses the HMM recognition model database (22), and compares the speech signal with the HMM recognition models looking for a pattern match. If such comparison yields a sufficiently close pattern match to one of the stored text-derived recognition models in terms of a decision rule (28), the HMM recognition engine provides a corresponding name recognition response designating the name-text associated with such recognition model.

The name recognition response is used to access the associated record in the medical database.

2. Recognition Model Creation

For the exemplary name recognition system, the recognition models associated with the different pronunciations for each name are created in a two step procedure that involves using a Boltzmann machine to generate phonetic feature sequences, and then using an HMM recognition model generator to construct the recognition models from the phonetic feature sequences.

2.1. Phonetic Feature Sequence Generation

A Boltzmann machine is a network that is trained to represent the probability density distribution of observables in a particular domain. It comprises simple interconnected units, at least some of which are external (input/output) units.

Each unit can be either "on" or "off"—the state of each unit (if not fixed) is a probabilistic function of the states of the units to which it is connected and the strength of the real-valued weights on the connections. All connection weights between units are symmetrical, representing mutually excitatory or mutually inhibitory relationships. Each configuration of the network has an energy value that is a function of the states and connection weights for all units.

The Boltzmann machine training algorithm is a procedure for gradually adjusting the weights on connections between units so that the network comes to model the domain of interest. It involves alternate cycles in which (a) the states of external units are either clamped (determined externally and held constant) or free (set randomly and allowed to change), while (b) all internal units are free.

For each initial configuration, a conventional simulated annealing procedure is used to bring the network to a state of equilibrium. Connection weights are adjusted to reduce the difference in energy between the clamped and free configurations.

Once trained, the network can perform pattern completion tasks probabilistically: a subset of its external units are set to values representing the input, and all other units are set randomly. Activations are propagated through the network, with the resulting states of the remaining external units representing the output. If the network has been trained successfully, the set of outputs produced for a given input represents the probability density of these outputs for the given input in the domain represented by the network.

The Boltzmann machine architecture and training algorithm is particularly useful in the context of the exemplary name recognition system because of the need to produce alternative outputs for the same input. The exemplary name recognition system uses a conventional Boltzmann machine architecture and training procedure.

Figure 2:
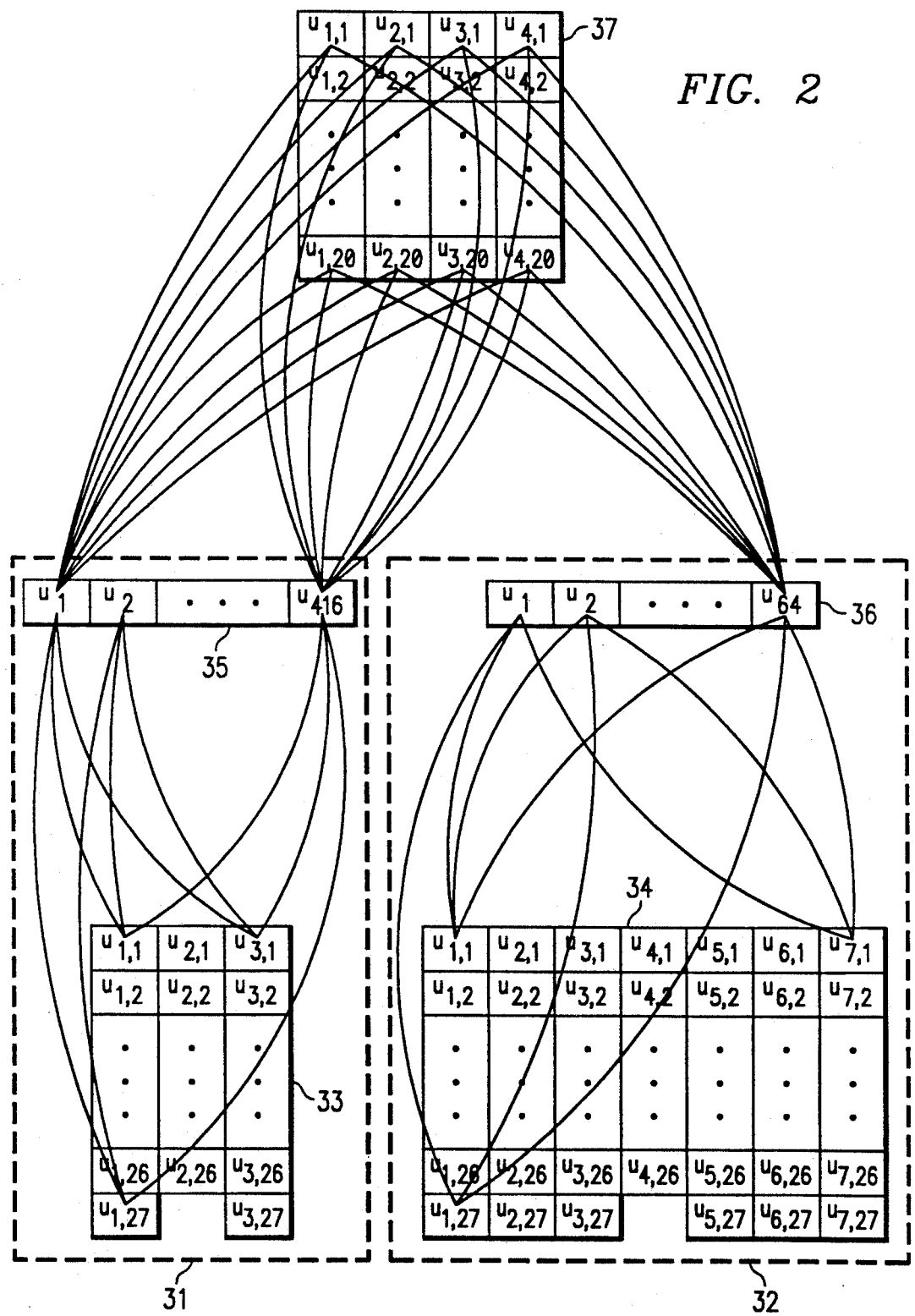
FIG. 2 illustrates a Boltzmann machine used to generate alternative name pronunciation representations from text input.

FIG. 2 illustrates the exemplary approach to implementing the Boltzmann machine for generating phonetic feature sequences. The Boltzmann machine 30 includes two subnetworks 31 and 32, each comprising a respective set of input units 33 and 34, and a respective set of internal units (called a hidden layer) 35 and 36. The machine has a single set of output units 37.

The subnetwork 31 contains input units to scan a small number of letters (for example, three) at a time. The subnetwork 32 contains input units to scan a larger number of letters (for example, seven) at a time.

Both subnetworks 31 and 32 are sliding windows. That is, each input name is moved through both windows simultaneously, with each letter in turn placed in the central position in the input unit sets 33 and 34. The output 37 represents the set of possible sound(s) corresponding to the center letter(s) in the string.

This exemplary approach to the configuration of the Boltzmann machine for generating phonetic feature sequences is based on two design criteria: (a) generally, a relatively small amount of contextual information will be sufficient to narrow the range of possible sound correspondences to a small set, but (b) choosing a correct sound from this set may require information occurring at more remote points in the name.

For each position in the windows represented by the input units 33 and 34, there are 26 or 27 input units corresponding to the letters of the alphabet plus "space" ("space" is omitted where unnecessary, i.e., in the central position). The unit corresponding to the current letter is on, while all other units are off. Each of these input units is connected to each unit in the corresponding hidden unit layer, and each of the hidden units is connected to each output unit.

The output 37 of the Boltzmann machine is a phonetic feature sequence: the output at each step represents a sequence of N features, where N is a small integer (possibly 1).

Alternatively, the output units could represent a sequence of N phones or phonemes. However, using phonetic features rather than other pronunciation representations such as phones or phonemes requires fewer output units, and allows greater flexibility.

The machine uses 2 M×N output units, where M is the number of phonetic features and N is the length of the output sequence. Each feature has a positive unit representing the presence of the feature and a negative unit representing the absence of the feature. A noncommittal or "neither" response (such as for a silent letter) is indicated by a zero value on both positive and negative units. In cases where N is greater than the length of the output sequence, adjacent sets of output units are assigned identical values during training.

For the exemplary Boltzmann machine, the subnetwork 31 contains 80 input units (a 3-letter window) and 416 hidden layer units. The subnetwork 32 contains 188 input units (a 7-letter window) and 64 hidden layer units. The output layer 37 contains 80 units (2 units each for 20 phonetic features, 2-phone sequence).

The connection weight values associated with the network are derived using the conventional Boltzmann machine training algorithm and a training database of names. The training database contains the spelling and all expected pronunciations of each name. In the exemplary system, pronunciations are represented as sequences of combinations of phonetic features, using the same feature set as in the Boltzmann machine (for example, +/−SYLLABIC, +/−VOICED, +/−NASAL, +/−LABIAL).

During the clamped cycles in the training procedure, each name in the training database is presented to the network in turn. The input units are clamped to the values corresponding to the letters in the name while the output units are clamped to values corresponding to one expected pronunciation.

Simulated annealing is used to bring the network to equilibrium, and its energy is then computed. This step is repeated for each expected pronunciation for each letter in each name.

Network performance is tested by (a) clamping input units to values corresponding to letters in names, (b) setting all other units to random values, (c) allowing activations to propagate through the network, and (d) observing the values of the output units. Performance is tested at intervals and training is terminated when the performance of the network reaches an acceptable level.

By repeatedly inputting the same name into the Boltzmann machine, different phonetic feature sequences can be produced, corresponding to alternative plausible pronunciations of the name. Thus, the goal is not to determine a nominal or "correct" pronunciation, but to create a recognition model for any pronunciation likely to be used by a person reading the name.

2.2. HMM Recognition Model Construction

HMM text-derived recognition models are constructed by using the output of the Boltzmann machine to select from a library of phonetic unit models, and then combining these phonetic models into name recognition models.

The phonetic model library comprises HMM phonetic unit models representing phonetic units. Each phonetic unit model represents sets of expected acoustic features and durations for these features.

FIG. 3a illustrates an exemplary phonetic unit model based on cepstral feature analysis and a simple exponential duration model. Other types of models, such as finite duration could be used.

The phonetic unit models are created and trained using conventional HMM model generation techniques, based on a speech database providing good coverage of the acoustic-phonetic features of speech for the context in which the name recognition system will be used. This speech database is distinct from the name database used in training the Boltzmann machine, which does not contain any speech material—the speech database typically does not include any of the names from the name training database.

The phonetic feature sequences generated by the Boltzmann machine are used to select corresponding phonetic unit models from the phonetic model library. That is, for each set of phonetic features observed in the Boltzmann machine output, the phonetic unit model representing the phonetic unit having that set of features is selected. Adjacent identical feature sets are collapsed to select a single phonetic unit model.

In cases where the Boltzmann machine phonetic feature sequence is consistent with more than one phonetic unit model, the recommended approach is to select all corresponding phonetic unit models. If the Boltzmann machine phonetic feature sequence is not consistent with any phonetic unit model, the recommended approach is to discard that output sequence. Alternatively, the most nearly consistent model(s) can be selected, using a heuristic procedure to determine degree of consistency. However, certain outputs (e.g. both positive and negative units off) are taken to represent "no phonetic model", i.e. the input letter is a "silent" letter.

The selected sequential phonetic units for each name are then sequentially combined into a recognition model representing the name.

FIG. 3b illustrates an the exemplary concatenation approach to combining phonetic unit models. Other conjoining procedures, such as overlapping the final state of one model with the initial state of the next model, could be used.

FIG. 3c illustrates recognition model construction where more than one phonetic unit model is selected at a given point in the sequence. Branches are constructed in the recognition model allowing any one of the alternate phonetic unit models to occur at that point.

FIG. 3d illustrates an exemplary procedure for constructing a single text-derived recognition model representing alternate pronunciations. First, a text-derived recognition model is constructed for each distinct Boltzmann machine output sequence. These text-derived recognition models can be used separately, or two or more of them can be combined for greater efficiency and reduced memory—this combining procedure is optional.

Thus, alternate text-derived recognition models representing alternative pronunciations can be combined into a single network by collapsing common paths (i.e. shared phonetic units at corresponding points in the phonetic unit sequence). In this case, the number of recognition models for a database of N names is simply N, but each recognition model represents M alternative pronunciations, where M is greater than or equal to 1, and where M may vary with the name.

3. Name Recognition

Name recognition is performed using conventional HMM recognition technology. Input to the system consists of a spoken name input (i.e., the spoken rendition of a name-text) from a person who has available the text of the name but who may or may not know the correct pronunciation.

This spoken name input is converted to a speech signal and recognized by a conventional HMM recognition procedure. The output of the HMM recognition procedure is then evaluated according to a decision rule. The output of the decision process is either one or more name-texts, or a rejection, i.e., a decision that no name-text was recognized.

3.1. HMM Recognition

The conventional HMM recognition procedure performs a pattern-matching operation, comparing the input speech signal to relevant HMM text-derived recognition models.

Referring to FIG. 1, for name recognition, the speech signal is compared to the HMM text-derived recognition models (22) constructed in advance from the phonetic unit models (18), which are based on predicted phonetic feature representations for that name-text. The HMM recognition models represent all predicted pronunciations of all name-texts in the text database (12).

Thus, for a text database of N names, recognition is an N-way discrimination problem. Each of the N name-texts is represented by a set of M models, where M is the number of pronunciation separately modeled for each name—M is greater than or equal to 1, and typically varies across names.

FIG. 4 illustrates an exemplary higher-level text-derived recognition model used in the recognition process—this model can be generalized to names containing arbitrary numbers of components.

The recognition model is a finite state machine containing a sequence of states and transitions. Each transition between states represents one component of the name (e.g., first name, last name).

The recognition model also includes transitions allowing optional nonspeech (e.g., silence) initially, between names, and finally. These nonspeech transitions allow the speech to be recognized without performing a prior speech endpointing procedure to determine the endpoints of each component of the name. They also allow pauses of variable lengths, including no pause, between components of the name.

3.2. Decision Rule

The HMM recognition procedure outputs one or more name scores representing the likelihood that the speech input is an instance of that text-derived recognition model. These name scores are then evaluated using a decision rule that selects either: (a) a single name-text, (b) a set of N rank-ordered name-texts, or (c) no name (a rejection).

In the exemplary HMM recognition procedure, the recognizer outputs name scores for all text-derived recognition models of all names. For names which have multiple recognition models representing alternative pronunciations, a single composite name score is derived from the separate name scores by selecting the single best name score.

The best (maximum likelihood) name score is then compared to the name score for the second most likely name. If the best name score exceeds a predetermined absolute score threshold, and if the difference between the best and second best name scores also exceeds a predetermined difference score threshold, then the corresponding name-text having the best name score is output as the recognized name. Otherwise, no name is output, i.e., the recognizer reports that no name was recognized.

Various alternate decision rules can be used. For example, in the simplest case, the recognition procedure outputs only one name score, i.e., the score for the single most likely text-derive recognition model, and a simple score threshold is used to accept or reject that name. Alternatively, the recognizer may output multiple name scores, and a rank-ordered list of the best N name-texts may be selected by exercising a decision rule for the most likely candidates. In this case, a second decision procedure employing independent information is used to select a single name-text from the list. For example, a single name-text may be selected by reference to other information stored in the application database (such as a patient's physician or diagnosis), or may be selected by the user.

4. Conclusion

Although the Detailed Description of the invention directed to certain exemplary embodiments, various modifications of these exemplary embodiments, as well as alternative embodiments, will be suggested to those skilled in the art. For example, the invention has general applicability for name recognition systems where the text of names are input in advance and used to create alternative recognition models associated with alternative pronunciations.

It is to be understood that the invention encompass any modifications or alternative embodiments that fall within the scope of the appended Claims.

What is claimed is:

1. A method of proper name recognition using text-derived recognition models to recognize spoken rendition of name-texts (i.e., names in textual form) that are susceptible to multiple pronunciations, where spoken name input (i.e., spoken rendition of a name-text) is from a person who does not necessarily know how to properly pronounce the name-text, comprising the steps:

entering name-text into a text database in which the database is accessed by designating name-text;

for each name-text in the text database, constructing a selected number of text-derived recognition models from the name-text, each text-derived recognition model representing at least one pronunciation of the name;

for each attempted access to the text database by a spoken name input, comparing the spoken name input with the text-derived recognition models; and if such comparision yields a sufficiently close pattern match to one of the text-derived recognition models based on a decision rule, providing a name recognition response designating the name-text associated with such text-derived recognition model.

2. The name recognition method of claim 1, wherein the step of constructing a selected number of text-derived recognition models is accomplished using a neural network.

3. The name recognition method of claim 1, where in the step of constructing a selected number of recognition models comprises the substeps:

for each name in the text database, inputting the name-text into an appropriately trained Boltzmann machine for a selected number of input cycles, with the machine being placed in a random state prior to each input cycle;

for each input cycle, generating a corresponding pronunciation representation sequence of at least one pronunciation for the name-text;

when the input cycles are complete, constructing from the pronunciation representation sequences that are different at least one text-derived recognition model representing at least one pronunciation of the name-text.

4. The method of proper name recognition using text-derived recognition models of claim 3, wherein the pronunciation representations are phonetic features.

5. The method of proper name recognition using text-derived recognition models of claim 3, wherein said Boltzmann machine comprises:

small and large sliding-window subnetworks, each including a respective set of input units and a respective set of internal units; and a set of output units;

said small sliding window subnetwork being composed of a smaller number of input units than said large sliding window subnetwork;

such that, for each input cycle, the step of generating a corresponding pronunciation representation sequence is accomplished by moving the name-text through both windows simultaneously, with each letter in turn placed in a central position in the respective sets of input units.

6. The method of proper name recognition using text-derived recognition models of claim 1, wherein the step of constructing a selected number of text-derived recognition models is accomplished using HMM modeling.

7. The method of proper name recognition using text-derived recognition models of claim 6, wherein the step of constructing text-derived recognition models comprises the substeps of:

creating a phonetic model library of phonetic unit models representing phonetic units, where each phonetic unit model represents sets of expected acoustic features and durations for such features;

for each pronunciation representation sequence generated by the Boltzmann machine, searching the phonetic model library for corresponding phonetic unit models; and if at least one corresponding phonetic unit model is found, selecting such phonetic unit model;

otherwise, discarding such pronunciation representation sequence; and after all pronunciation representation sequences have been used to search the phonetic model library, constructing a corresponding text-derived recognition model using the selected phonetic unit models.

8. The method of proper name recognition using text-derived recognition models of claim 7, wherein the substep of selecting such phonetic unit model comprises the substep;

if at least one phonetic unit model is found that corresponds to the pronunciation representation sequence with a predetermined degree of consistency, selecting such phonetic unit model.

9. The method of proper name recognition using text derived recognition models of claim 1, wherein the step of providing a name recognition response designating the name-text associated with such text-derived recognition model is accomplished according to the decision-rule substeps of:

for each spoken name input, assigning first scores to the text-derived recognition models representing a likelihood that the spoken name input is an instance of that recognition model; and evaluating the first scores using a decision rule that selects as a name recognition response either: (a) a single name-text, (b) a set of N rank-ordered name-texts, or (c) no name.

10. The method of proper name recognition using text-derived recognition models of claim 9, wherein the step of assigning first scores comprises the substeps of:

for each spoken name input, assigning name scores to all text-derived recognition models for all name texts representing of that likelihood that the spoken name input is an instance of that recognition model; and for names with multiple text-derived recognition models representing alternative pronunciations, assigning a single name score derived by selecting a single best name score associated with a text-derived recognition model which is most likely.

11. The method of proper name recognition using text-derived recognition models of claim 10, wherein the step of evaluating the first scores using a decision rule is accomplished by:

comparing the best name score is then compared to the name score for a text-derived recognition model which is second most likely; and if the best name score exceeds a predetermined absolute score threshold, and if the difference between the best and second best name scores also exceeds a predetermined difference score threshold, then the name-text associated the text-derived recognition model having the best score is output as the name recognition response;

otherwise, the name recognition response indicates no name-text.

12. A method of proper name recognition using text-derived recognition models to recognize spoken rendition of name-texts (i.e., names in textual form) that are susceptible to multiple pronunciations, where spoken name input (i.e., the spoken rendition of a name-text) is from a person who does not necessarily know how to properly pronounce the name-text, comprising the steps:

entering name-text into a text database in which the database is accessed by designating name-text;

for each name-text in the text database, inputting the name-text into an appropriately trained Boltzmann machine for a selected number of input cycles, with the machine being placed in a random state prior to each input cycle;

for each input cycle, generating a corresponding phonetic feature sequence of at least one pronunciation for the name-text;

when the input cycles are complete, constructing from the phonetic feature sequences that are different at least one text-derived recognition model representing at least one pronunciation of the name-text;

for each attempted access to the text database by a spoken name input, comparing the spoken name input with the stored text-derived recognition models; and if such comparison yields a sufficiently close pattern match to one of the text-derived recognition models based on a decision rule, providing a name recognition response designating the name-text associated with such text-derived recognition model.

13. The method of proper name recognition using text-derived recognition models of claim 12, wherein the step of constructing from the phonetic feature sequences that are different at least one text-derived recognition models comprises the substeps of:

creating a phonetic model library of phonetic unit models representing phonetic units, where each phonetic unit model represents sets of expected acoustic features and durations for such features;

for each phonetic feature sequence generated by the Boltzmann machine, searching the phonetic model library for corresponding phonetic unit models; and if at least one corresponding phonetic unit model is found, selecting such phonetic unit model;

otherwise, discarding such phonetic feature sequences; and after all phonetic feature sequences have been used to search the phonetic model library, constructing a corresponding text-derived recognition model using the selected phonetic unit models.

14. The method of proper name recognition using text-derived recognition models of claim 12, wherein the step of providing a name recognition response designating the name-test associated with such text-derived recognition model is accomplished according to the decision-rule substeps of:

for each spoken name input, assigning first scores to the text-derived recognition models representing a likelihood that the spoken name input is an instance of that recognition model; and evaluating the first scores using a decision rule that selects as a name recognition response either: (a) a single name-text, (b) a set of N rank-ordered name-texts, or (c) no name.

15. A proper name recognition system using text-derived recognition models to recognize spoken rendition of name-texts (i.e., names in textual form) that are susceptible to multiple pronunciations, where spoken name input (i.e., the spoken rendition of a name-text) is from a person who does not necessarily know how to properly pronounce the name-text, comprising:

- a text database into which are entered name-texts, where the database is accessed by designating name-text;
- an appropriately trained Boltzmann machine responsive to the input of a name-text for generating a corresponding phonetic feature sequence of at least one pronunciation for the name-text;
- each name-text being input to said Boltzmann machine a selected number of input cycles, with the machine being placed in a random state prior to each input cycle;
- a text-derived recognition model generator for constructing, after the selected number of input cycles for a name-text is complete, from the phonetic feature sequences that are different at least one text-derived recognition model representing at least one pronunciation of the name-text;
- a name-text recognition engine for comparing, for each attempted access to the text database by a spoken name input, such spoken name input with the generated text-derived recognition models, and if such comparison yields a sufficiently close pattern match to one of the text-derived recognition models based on a decision rule, providing a name recognition response designating the name-text associated with such text-derived recognition model.

16. The proper name recognition system using text-derived recognition models of claim 15, further comprising:

- a phonetic model library of phonetic unit models representing phonetic units, where each phonetic unit model represents sets of expected acoustic features and durations for such features;
- such that, for each phonetic feature sequence generated by the Boltzmann machine, said text-derived recognition model generator searches the phonetic model library for corresponding phonetic unit models, and if at least one corresponding phonetic unit model is found, selects such phonetic unit model, otherwise, it discards such phonetic feature sequence; and
- after said text-derived recognition model generator has so processed all phonetic feature sequences, it constructs a corresponding text-derived recognition model using the selected phonetic unit models.

* * * * *